United States Patent
Contryman et al.

(10) Patent No.: US 10,867,171 B1
(45) Date of Patent: Dec. 15, 2020

(54) SYSTEMS AND METHODS FOR MACHINE LEARNING BASED CONTENT EXTRACTION FROM DOCUMENT IMAGES

(71) Applicant: Omniscience Corp., Palo Alto, CA (US)

(72) Inventors: Alexander Wesley Contryman, San Francisco, CA (US); Jacob Ryan van Gogh, Mountain View, CA (US); Manu Shukla, Sunnyvale, CA (US)

(73) Assignee: OMNISCIENCE CORPORATION, Palo Alto, CA (US)

( * ) Notice: Subject to any disclaimer, the term of this patent is extended or adjusted under 35 U.S.C. 154(b) by 200 days.

(21) Appl. No.: 16/167,334

(22) Filed: Oct. 22, 2018

(51) Int. Cl.
*G06K 9/00* (2006.01)
*G06N 20/20* (2019.01)
*G06T 3/60* (2006.01)

(52) U.S. Cl.
CPC ..... *G06K 9/00463* (2013.01); *G06K 9/00456* (2013.01); *G06N 20/20* (2019.01); *G06T 3/60* (2013.01)

(58) Field of Classification Search
CPC .. G06K 9/00463; G06K 9/00456; G06T 3/60; G06N 20/20
USPC .......................................................... 382/289
See application file for complete search history.

(56) References Cited

U.S. PATENT DOCUMENTS

| | | | |
|---|---|---|---|
| 7,149,347 B1 * | 12/2006 | Wnek | G06K 9/00469 382/159 |
| 2015/0278593 A1 * | 10/2015 | Panferov | G06K 9/00483 382/182 |
| 2018/0300315 A1 * | 10/2018 | Leal | G06F 40/268 |
| 2020/0097718 A1 * | 3/2020 | Schafer | G06K 9/00469 |

* cited by examiner

*Primary Examiner* — Ayodeji O Ayotunde
(74) *Attorney, Agent, or Firm* — Womble Bond Dickinson (US) LLP

(57) ABSTRACT

A method and apparatus for recognizing and extracting data from a form depicted within an image of a document are described. The method may include receiving the image of the document, the image depicting the form and data contained one the form. The method may also include transforming the image of the document to a set of one or more key, value pairs by processing the image of the document with a sequence of two or more trained machine learning based image analysis processes, wherein keys are relevant to forms of the type depicted in the form, and wherein each value is associated with a key. The method may also include generating a data output that comprises the set of key, value pairs for textual data recognized and extracted from the form depicted in the image.

20 Claims, 9 Drawing Sheets

SYSTEMS AND METHODS FOR MACHINE LEARNING BASED CONTENT EXTRACTION FROM DOCUMENT IMAGES

BACKGROUND

Organizations, such as medical organizations, insurance organizations, financial institutions, and other organizations, typically collect information from their customers. The customer information is provided by the customer on a form, such as a paper form, an interactive form rendered within an application (e.g., on the customer's mobile device), or an editable form displayed using a web page (e.g., on a computer system of the customer). Interactive and web page based forms present few challenges to the collection of customer information, as the customer information within fields of the form is directly inputted into the form, and is capable of being checked for appropriateness of data entered (e.g., check that numbers are entered in an age field, letters are entered in a name field, birth data within an acceptable range, etc.).

Customer information provided by the customer on a paper form may also be captured quite easily when the structure of the form is known in advance and images of the form are captured using controlled and high quality image capture techniques. For example, forms having structures known in advance may have that structure programmed into an image capture and extraction system. Furthermore, the manner of the form's input may be closely controlled, such as by capturing images of the form using a specialized scanner, high resolution multi-function peripheral device, etc. to generate consistent and high resolution images of the customer's input on the form having a known structure, a consistent orientation, a specific image resolution, etc. Because the form's structure is known, and the form's input closely controlled so that image capture is consistent, the customer information may be easily extracted from such form images. Such image capture and information extraction techniques, however, are inflexible and/or completely fail when there are changes in form formats, unknown form formats, low image quality, etc.

Therefore, significant technical problems with the capture of customer information from forms arise when a tabular or other structural definition is not known about a form before it is captured. That is, the image capture and extraction system discussed above cannot be pre-programmed to recognize the input form images since it does not know the structure of the form, and thus it will fail to be able to capture customer information from the form. Furthermore, images of forms may be captured by agents of the organization (e.g., a field insurance adjuster, a representative of a medical organization, etc.) using varied techniques. For example, capture of an image of a form using a mobile device's imaging system (e.g., a camera on a mobile telephone or tablet computer) may capture skewed images, images having low and/or differing resolutions, as well as other factors that result in the capture of varied form images of varying quality. Again, the image capture and extraction system discussed above will not be able to extract information from the form given the potentially differing and/or low resolution, skewed input, and lack of known form formatting. The problems discussed above are made more acute by the convenience and adoption of mobile devices (e.g., cellular telephones, smart phones, tablet computers, purpose built devices, etc.) for conducting data gathering operations on behalf of organizations.

BRIEF DESCRIPTION OF THE DRAWINGS

The present disclosure will be understood more fully from the detailed description given below and from the accompanying drawings of various embodiments, which, however, should not be taken to limit the embodiments described and illustrated herein, but are for explanation and understanding only.

DETAILED DESCRIPTION

Figure 1:
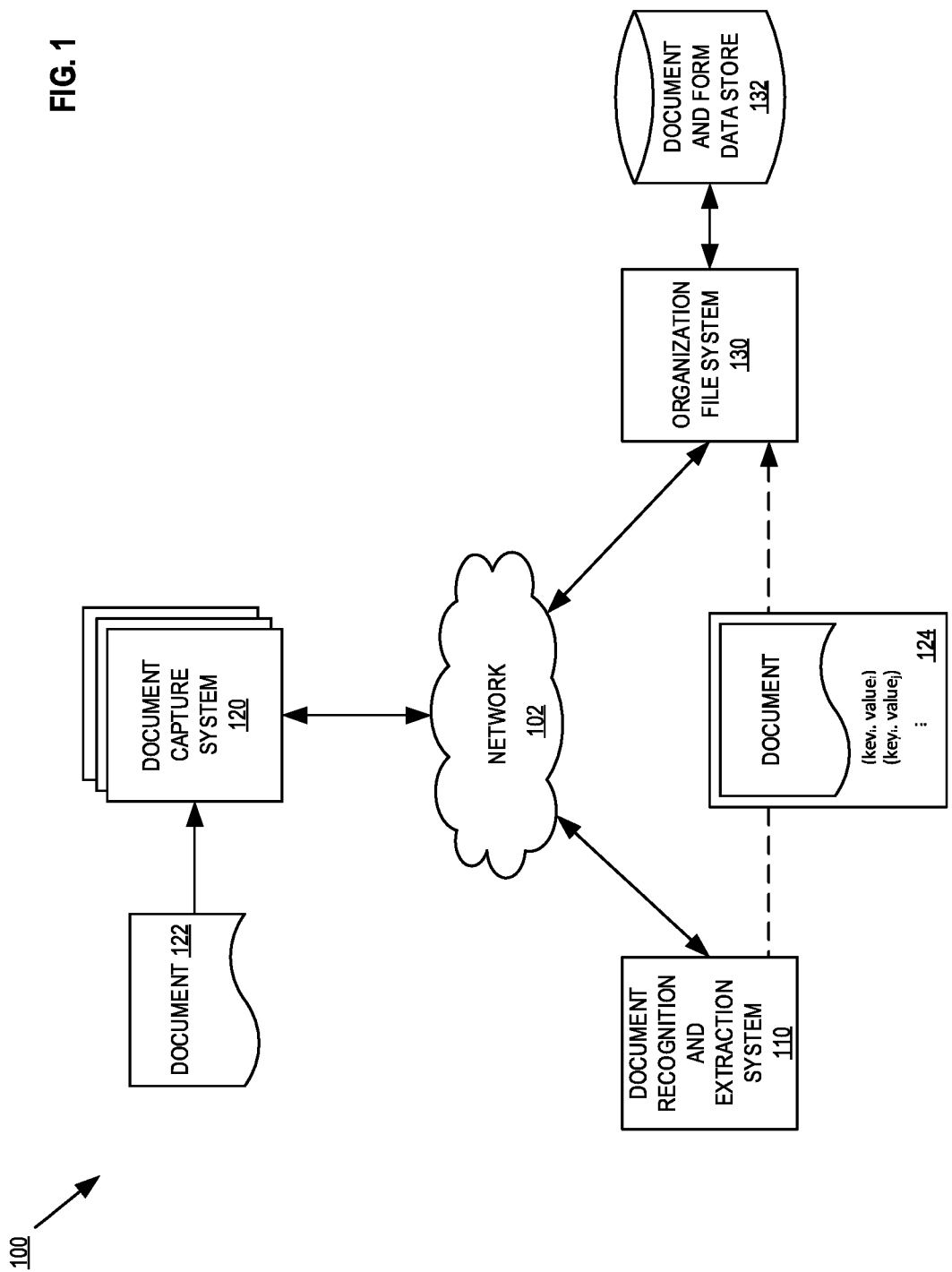
FIG. 1 is a block diagram of an exemplary system architecture for extracting information from document images by a document recognition and extraction system.

In the following description, numerous details are set forth. It will be apparent, however, to one of ordinary skill in the art having the benefit of this disclosure, that the embodiments described herein may be practiced without these specific details. In some instances, well-known structures and devices are shown in block diagram form, rather than in detail, in order to avoid obscuring the embodiments described herein.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "transforming", "generating", "processing", "analyzing", "associating", "combining", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The embodiments discussed herein may also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the embodiments discussed herein are not described with reference to any particular programming language. It will be appreciated that a variety of programming languages may be used to implement the teachings as described herein.

FIG. 1 is a block diagram of an exemplary system architecture 100 for extracting information from document images by a document recognition and extraction system.

In one embodiment, the system 100 includes one or more computer systems associated with agents of an organization, such as document capture system 120, an organization file system 130, and a document recognition and extraction system 110. In one embodiment, document capture system 120 may be a mobile computing device, such as a smartphone, tablet computer, wearable computing device, etc. The document recognition and extraction system 110 and the organization file system 130 may also be computing devices, such as one or more server computer systems, desktop computer systems, etc.

The document capture system 120, an organization file system 130, and a document recognition and extraction system 110 may be coupled to a network 102 and communicate with one another using any of the standard protocols for the exchange of information. In one embodiment, one or more of the document capture system 120, an organization file system 130, and a document recognition and extraction system 110 may run on one Local Area Network (LAN) and may be incorporated into the same physical or logical system, or different physical or logical systems. Alternatively, document capture system 120, an organization file system 130, and a document recognition and extraction system 110 may reside on different LANs, wide area networks, cellular telephone networks, etc. that may be coupled together via the Internet but separated by firewalls, routers, and/or other network devices. In one embodiment, document recognition and extraction system 110 may reside on a single server computer system, or be distributed among different servers, coupled to other devices via a public network (e.g., the Internet) or a private network (e.g., LAN). It should be noted that various other network configurations can be used including, for example, hosted configurations, distributed configurations, centralized configurations, etc.

In one embodiment, document recognition and extraction system 110 is responsible for extracting information from document images, such as an image of document 122 captured by document capture system 120. In embodiments, document recognition and extraction system 110 can process document images where the document depicted within the image is skewed (e.g., rotated away from a vertical axis by a certain number of degrees) and/or the document image is of low quality (e.g., has a resolution below a certain resolution and/or may have other image artifacts, such as blurring, detail loss due to compression of the captured document image, etc.). Furthermore, the formatting and/or structure of the input (e.g., image of document 122) need not be known by the document recognition and extraction system 110. Thus, different forms, handwritten documents, and other input may be analyzed for content recognition and information extraction by document recognition and extraction system 110 without the limitations imposed by prior systems. For example, a first organization and a second organization may both capture medical information from patients, but use forms having different formatting. The presently described techniques are able to extract textual information from the forms of both organizations without knowing the formatting and structure of the forms.

In one embodiment, document capture system 120 initially captures an image of document 122. For example, document capture system 120 may be a mobile device (e.g., a smartphone or tablet computer) associated with an agent of an organization. Document capture system 120 may also be other devices, such as scanners, mobile multi-function peripheral devices, etc. The document capture system 120 may then capture images of documents, such as single or multi-page forms used by the organization to capture information from organization customers, organization employees, organization agents, as well as others, from which data is captured for the organization. In embodiments, the alignment and/or quality of the captured image may vary from image data capture to image data capture, and among different document capture systems.

In one embodiment, the image of the document 122 captured by document capture system 120 is associated with a context from among a plurality of contexts. In embodiments, forms may be used to capture automobile insurance information, medical insurance information, life insurance information, loan application information, and any number of different types of forms. Furthermore, not only does form type/usage define a form's context, but other factors such as language (e.g., English, Japanese, Portuguese, Chinese, etc.) may also help to define the context for the image of the document. For example, document images may be captured for health insurance forms in the Japanese language, which defines the context of the associated form images. As another example, loan application forms may be captured in the English language, which defines the context of the associated form images. As yet another example, a sales contract may be captured in Ireland, which defines the context of the associated form images that may be different if the same form had been captured in the U.S. even though both are in the English language. In embodiments, form usage, language, cultural norms, customs, etc. may be used to form the context of a form, as discussed herein. Furthermore, form context and form type are used interchangeably herein.

Document capture system 120 then transmits the image of the form 122 either directly to document recognition and extraction system 110 or organization files system 130. In embodiments, document capture system 120 transmits the form via email attachment, MMS message, an FTP upload, or other mechanism for transferring images of the document 122. In an embodiment, where document capture system 120 transfers the form to organization file system 130, organization file system 130 may store the image of document 122 in data store 132. In either embodiment, either document capture system 120 and/or organization file system 130 may transfer individual instances of images captured of documents, or may transfer batches of document images, to document recognition and extraction system 110.

In embodiments, document recognition and extraction system 110 receives images of document(s), such as an image of document 122. As discussed herein, the image 122 is not associated with a form, layout, or other structural description of the form depicted in the received document image. Furthermore, the quality of the received document image is likely to be of low quality (e.g., reduction in image quality due to one or more of skew greater than 10 degrees, having a resolution less than 300 DPI, and/or having other artifacts impacting image quality). However, document recognition and extraction system 110 does know the context or form type associated with the form. In embodiments, each context for which document recognition and extraction system 110 can use to analyze a received document image as discussed in greater detail below, is associated with a plurality of keys. In embodiments, each key for a context is a data field typically found in forms for the context. For example, a form having a medical context may have the keys name, age, weight, heart rate, prior conditions, etc. As another example, a form having a loan application context may have the keys name, age, occupation, years employed, credit score, etc. From these two examples, different contexts may be associated with different keys, such that the keys are relevant to the particular context of a form.

In one embodiment, in response to receiving or otherwise accessing the image of the document 122, document recognition and extraction system 110 utilizes the context of the form depicted within the image of document 122 to select and utilize a series of trained machine learning image analysis operations to predict and correct document rotation, perform text segmentation, perform text recognition, and then extract values associated with keys for the context associated with the image. In embodiments, each of these operations collectively form a document processing pipeline for a given context, and will be discussed in greater detail herein. Furthermore, each operation in the pipeline may include using one or more trained machine learning analysis techniques, and may utilize different trained machine learning analysis systems (e.g., neural networks, regression, support vector machines, decision trees, etc.) selected based on the task being performed. For example, prediction and correction of document rotation may utilize a first type of machine learning analysis suited to determining when a document is skewed, by how much, and how to correct the document's rotation, while extracting values and associating the values with keys utilizes a second type of machine learning analysis suited to associating recognized text with keys when creating key value pairs for a form. In embodiments, the different types of machine learning analysis may include differently trained machine learning analysis systems (e.g., systems trained using different sets of training data), different machine learning architectures (e.g., a regression, random forests, neural networks, support vector machines, etc.) used by the machine learning analysis systems of different stages, or a combination.

In one embodiment, for each document image analyzed by document recognition and extraction system 110, document recognition and extraction system 110 outputs the information extracted from the form. In embodiments, this can include a plurality of key value pairs, where each key is a field associated with a form based on the form's context and the associated value is text recognized and determined to be associated with the key (e.g., (Name, John Doe), (Age, 65), (Weight, 182), (Previous Conditions, Heart Surgery), . . . ($Key_n$, $Value_n$)). The output may also include the originally received document image, document image location data for keys and/or values extracted from the document image, location data for all recognized character sequences, one or more correction factors that were applied (e.g., rotation applied, contrast adjustment, etc.), as well as other information relevant to the form, the values within the form, and the processing performed on the form.

In one embodiment, document capture document recognition and extraction system 110 assembles a data package 124 including the key, value pairs, and optionally one or more of the document image, location data, corrections applied, etc. In one embodiment, the data package may be a structured document, such as a comma separated value file, an extensible markup language (XML), etc. that contains the data extracted by document recognition and extraction system 110 from the image of document 122.

Organization file system 130 receives the data package 124, and then stores the extracted form data in document and form data store 132.

By not relying on image processing techniques that utilize known form formats, high quality scans, etc., document recognition and extraction system 110 need not make hard coded assumptions about the layout and structure of document images. This enables document recognition and extraction system 110 to perform high quality and high accuracy text recognition and value extraction on document images of poor quality, and with great flexibility for capturing content from a wide variety of input form types/contexts. Furthermore, the machine learning techniques discussed herein are adaptable to new form types, new document layouts, new languages, new document qualities, etc., which enables document recognition and extraction system 110 to be used for any number of forms and contexts.

Figure 2:
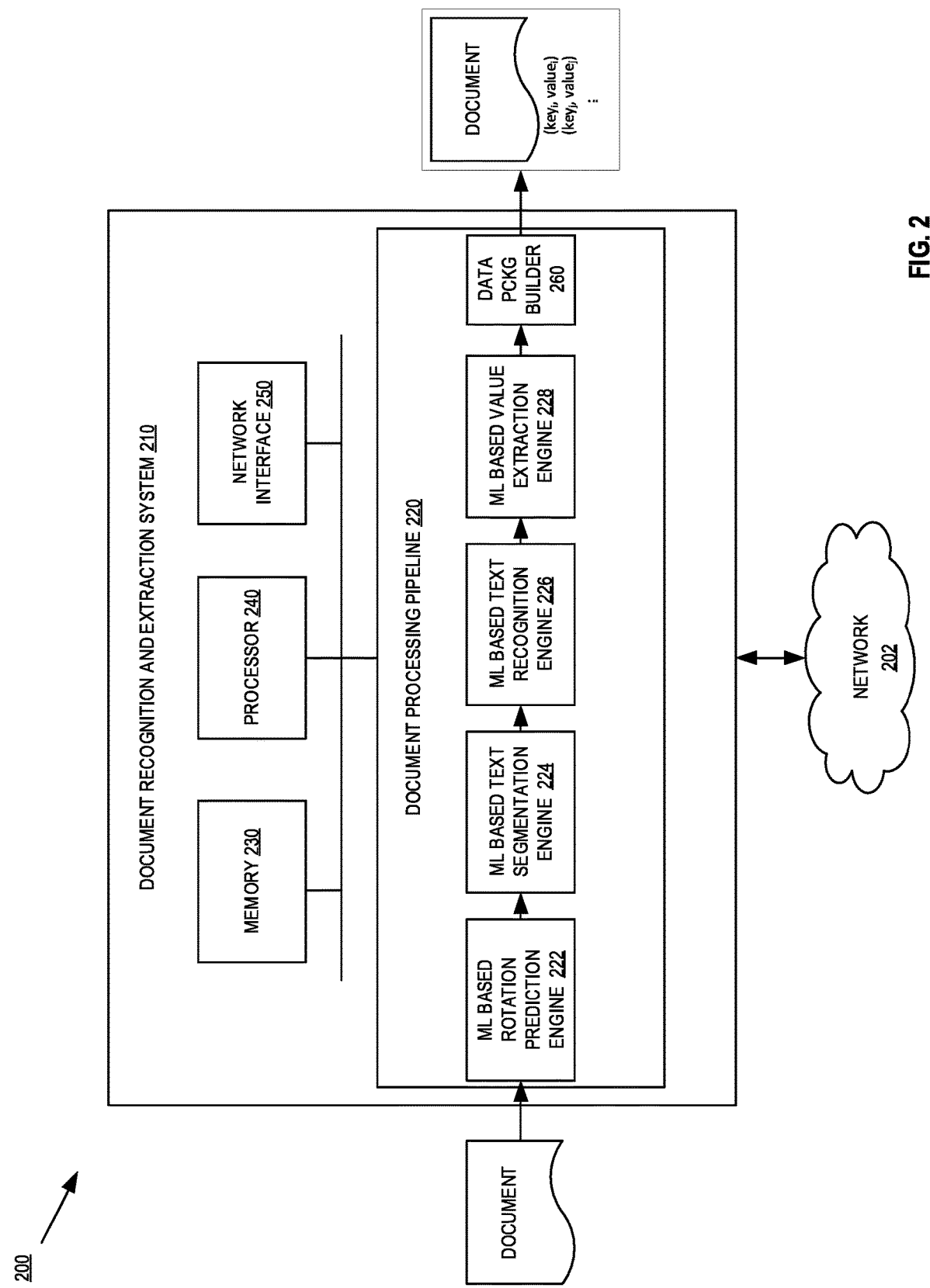
FIG. 2 is a block diagram of one embodiment of the document recognition and extraction system.

FIG. 2 is a block diagram of one embodiment 200 of a document recognition and extraction system 210. Document recognition and extraction system 210 provides additional details for the document recognition and extraction system 110 discussed above in FIG. 1. As shown in FIG. 2, document recognition and extraction system 210 receives an image of a document and generates a data package including key, value pairs for data extracted from the received document image. As discussed herein, the generated data package may also include the received document image, correction factors, document image location data for keys and/or values extracted from the received document image, location data for all recognized character sequences, etc.

In FIG. 2, the document recognition and extraction system 210 includes processor 240, memory 230, network interface 250, and document processing pipeline 220.

The network interface 250 may be an interface that is coupled to a network (not shown) in order to receive information and transmit information. The memory 230 may include one or more different types of storage such as hard disk drive storage, nonvolatile memory, and volatile memory such as dynamic random access memory.

The processor 240 may be coupled to the network interface 250 and the storage 230. The processor 240 may be a microprocessor, a microcontroller, a digital signal processor, or a central processing unit. The term "processor" may refer to a device having two or more processing units or elements, e.g. a CPU with multiple processing cores. The processor 240 may be used to control the operations of the document processing pipeline 220, including the machine learning (ML) based rotation prediction engine 222, the ML based text segmentation engine 224, the ML based text recognition engine 226, the ML based value extraction engine 228, and the data package builder 260, by executing software instructions or code stored in the storage 230. For example, the processor 240 may execute instructions stored in the storage 230, which cause the processor 240 to control the operations of the document processing pipeline 220 and perform the recognition and extraction operations described in the embodiments of the present disclosure.

In one embodiment, document processing pipeline utilizes a sequence of ML based techniques that transforms the received document image, analyzes the image data, and extracts information based on the analysis. As discussed herein, this includes generating one or more key, value pairs as a result of the sequence of ML analysis operations, where the keys are keys from a context associated with the input document image (e.g., keys for forms of a type for the input image, and the values are recognized and extracted data from the input document image). In embodiments, the type and number of operations in the pipeline can vary depending on the method in which the document image is captured, document character set and language, document layout (e.g. tabular, list, unstructured text), etc. The pipeline sequence illustrated herein is an example of an embodiment of a pipeline for performing form analysis.

Figure 8C:
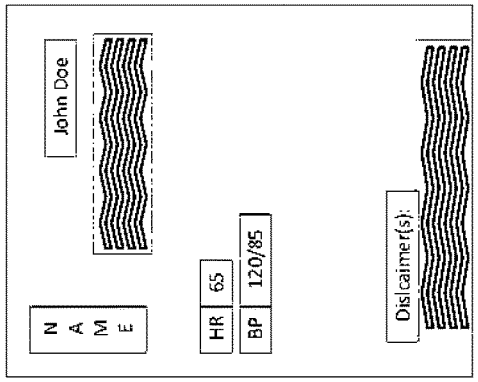
FIGS. 8A-8F illustrate the processing operations that an input image of a captured document image undergo to generate an output including the document image and extracted document information.
Figure 8F:
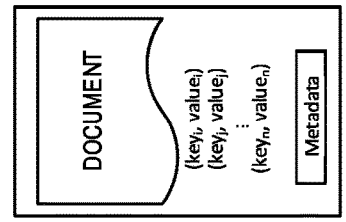
Figure 8B:
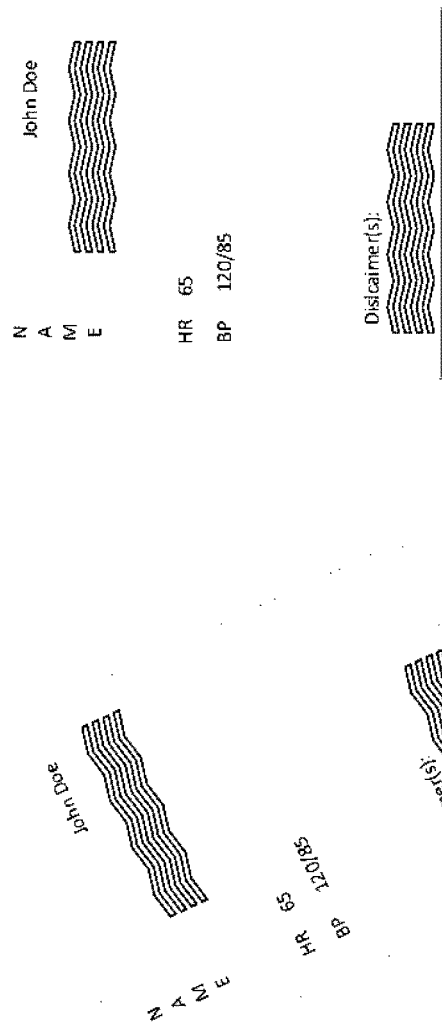
Figure 8E:
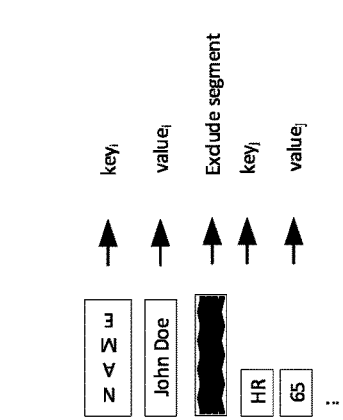
Figure 8A:
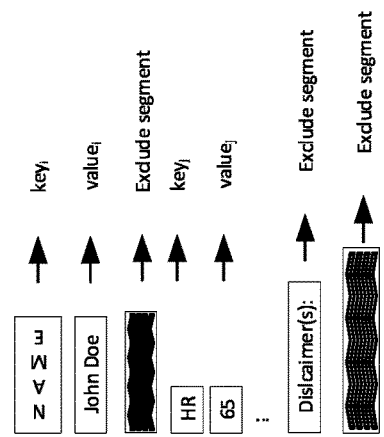

In one embodiment, a document image having a specified context is input in the document processing pipeline 220. One example of the received document is illustrated in FIG. 8A. In response to the document image input, ML based rotation prediction engine 222 performs an initial ML based feature extraction given the document's context (e.g., type of form and language). In embodiments, as would be known by those skilled in the art, a machine learning analysis system can be trained given a series of varying inputs having different values (e.g., in this case potential rotations, content, formats, etc.), and expected outputs. The machine learning analysis system, such as regression, random forests, neural networks, support vector machines, etc. may then be recursively trained based on refinement of the machine learning analysis system tuning the actual output to the expected output until an acceptable level of prediction, in this case rotation prediction, is achieved. Furthermore, as discussed herein, different ML based rotation prediction engines can be trained for different contexts. In one embodiment, based on the feature extraction, ML based rotation prediction engine 222 then performs a rotation angle variable determination, so that the received document image can be rotated using the determined rotation angle. An example illustration of the document after rotation is shown in FIG. 8B.

The rotated document is then received by the ML based text segmentation engine 224. As discussed above, the ML based text segmentation engine 224 is also a context specific ML based analysis engine. In one embodiment, ML based text segmentation engine 224 utilizes a machine learning analysis technique to make a probabilistic determination of text segments of interest in the rotated document image. That is, based on the context, the ML engine used in ML based text segmentation engine 224 (e.g., regression, neural networks, support vector machines, etc.) generates a location and size of predicted text segments within the rotated documents by scanning pixels of the document image to locate segments, such as the segments illustrated in FIG. 8C.

Figure 8D:
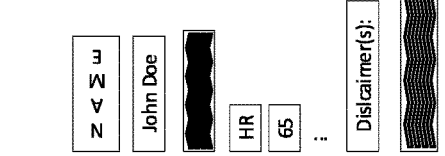

The ML based text recognition engine 226 receives the text segment location from the ML based text segmentation engine 224, and extracts image patches for each segment, as illustrated in FIG. 8D. Based on the content of each image patch, an orientation of the text within the patch can be determined, and rotated for horizontal scanning purposes (e.g., vertical text, such as NAME, rotated to horizontal text in the extracted image patch). In one embodiment, a trained machine learning analysis is then performed on each image patch using a horizontal scanning of the contents of each image patch to generate a dense set of image data (e.g., a set of image data forming text in the segment), and then analyzed by a different trained machine learning analysis system to encode (e.g., into a fixed length sequence forming a prediction of content) and decode the dense sequence into character predictions for each character in the predicted content for a segment (e.g., character 1 is 90% likely to be an A, character 1 is 35% likely to be a 4). The character predictions can then be used to select the likely characters, such as by applying a greedy selection technique, applying a beam search, or combining either of those techniques with a lexicon lookup, to generate an output a character sequence for the segment.

The output character sequences include character sequences corresponding to values (e.g., data in the form that is associated with a key) and character sequences corresponding to unwanted data (e.g., disclaimers, descriptions, exclusions, etc.). ML based value extraction engine 228 receives the output character sequences, as well as other data such as the location of the segments within a form, and created document features from the segments and locations. In one embodiment, ML based value extraction engine 228 uses a trained machine learning analysis system (e.g., neural network, regression, support vector machine, etc.) to associate the recognized text with values, and associate related keys and values to generate key, value pairs. Along with this, certain text sequences from extracted segments may also be excluded from the key value pairs as being not needed. FIG. 8E illustrates the text segments and their associated values and keys. Furthermore, each of these is associated with locations, so that a comprehensive description of each element is obtained following the machine learning based analysis performed by ML based value extraction engine 228 (e.g., extracted segment characters, location within document image, association of recognized key, value pairs).

In one embodiment, a data package builder 260 takes the extracted segment characters, locations within document image, association of recognized key, value pairs, the initial corrections applied to the document (e.g., the rotation, contrast adjustment, color correction, etc.), images of the original input document and/or the rotated/corrected document, and outputs a data package. The data package includes at least the key, value pairs extracted from the original input document. However, additional data, such as the original document image, the rotated and/or corrected document image, and document metadata (e.g., locations of keys and/or values, locations of all recognized character sequences, correction factors applied, such as rotation, contrast adjustment, color correction applied, etc.) can also be included in the data package generated by data package builder 260. In one embodiment, the data package is a formatted file including the document image and extracted information, as illustrated in FIG. 8F. In embodiments, the formatted data package can be a file storing the document image, key, value pairs, and metadata Document processing pipeline 220 may then use the network interface 250 to transmit the data package to an organization, such as to an organization file system 130 for storage of recognized and extracted form data.

In accordance with the discussion above, the document input into the document recognition and extraction system is flexible in terms of image quality, image rotation, language, form type, etc. Furthermore, the input image need not be analyzed with respect to a form having a known layout and/or structure prior to image capture. Instead, the described series of machine learning analysis operations act in concert to provide a flexible and accurate content recognition and extraction system suitable for analyzing a wide array of images of documents captured by different devices. Furthermore, very little effort is needed from the organization utilizing the techniques discussed herein, except in some embodiments the establishment of an account with document recognition and extraction system, generating and using identifiers for identifying captured images of documents, and providing instructions as to a context or type of form depicted in a document image. Furthermore, the flexibility and ease of use enable the same organization to use different types of forms in potentially different languages (e.g., differing contexts) again with almost no effort.

Figure 3:
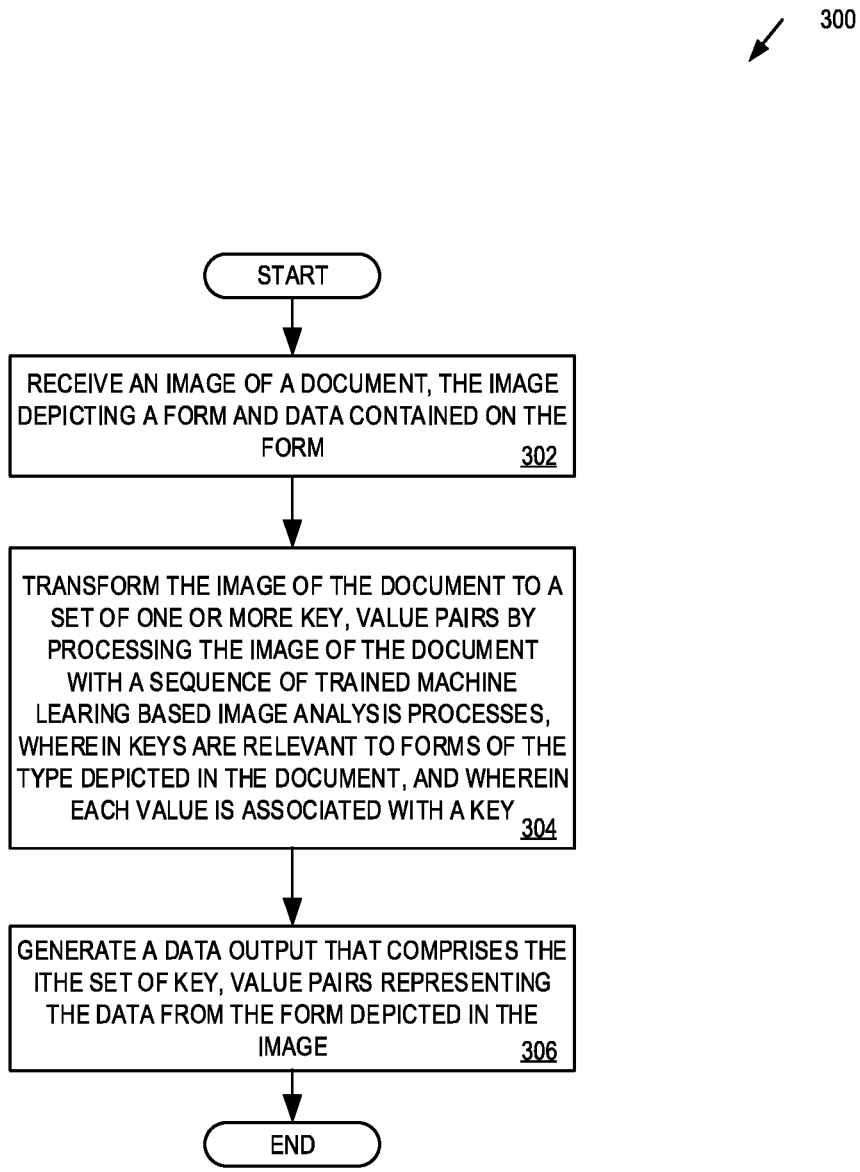
FIG. 3 is a flow diagram of one embodiment of a method for processing an image of a document to recognize and extract data from a form depicted within the image.

FIG. 3 is a flow diagram of one embodiment of a method 300 for processing an image of a document to recognize and extract data from a form depicted within the image. The method 300 is performed by processing logic that may comprise hardware (circuitry, dedicated logic, etc.), software (such as is run on a general purpose computer system or a dedicated machine), firmware, or a combination. In one embodiment, the method 300 is performed by a document recognition and extraction system (e.g., system 110 or 210).

Referring to FIG. 3, processing logic begins by receiving an image of a document, the image depicting a form and data contained one the form (processing block 302). As discussed herein, the image may be captured by any of a number of different devices, and a quality of the image (e.g., resolution, rotation, artifacts, etc.) may be low. Furthermore, the form depicted in the image may be any of a number of different types/contexts of form (e.g., medical, financial, insurance, etc. in various languages from various regions). Additionally, the form depicted in the image is unstructured in that only a type of form is known upon receipt of the image of the document, and not a structural or layout description (e.g., an XML description or other document description is not known about the received form depicted in the document image).

As discussed herein, however, the presently described embodiments do not need to use a document layout or structure description, and instead apply a sequence of trained machine learning based image analysis processes to extract data from the form. Thus, processing logic transforms the image of the document to a set of one or more key, value pairs by processing the image of the document with the trained machine learning based image analysis processes, wherein keys are relevant to forms of the type depicted in the form, and wherein each value is associated with a key (processing block 304). Because the form type is known (e.g., medical, dental, insurance, loan application, language type, region, etc.), different trained machine learning image analysis processes can be selected for usage based on the type of form. For example, a medical form in the Japanese language may use different trained machine learning image analyzers than an insurance form in the English language for the region of California. Each machine learning image analysis process, as discussed herein, may be trained using training data generated for, and relevant for, forms of a specific type. Furthermore, each form type may be associated with a set of keys, and the values extracted from the form provide data for the keys. Thus, the transformation performed by processing logic generates key, value pairs recognizing and extracting the data depicted in the form despite the form being unstructured and of low quality thereby improving the quality and accuracy of data capture from form images in less than ideal situations (e.g., agents of an organization capturing form data in the field).

Processing logic then generates a data output that comprises the set of key, value pairs representing the data from the form depicted in the image (processing block 306). In one embodiment, the data output may be an electronic file, such as a comma separated value file, a database file, etc. that includes the data recognized and extracted from the form depicted in the image data. Additional data, such as the original document image and/or processed document image, document metadata, metadata learned about the document and/or document segments during machine learning analysis, as well as any other relevant data may also be included in the generated data output. In embodiments, the generated data output may then be transferred to an appropriate system, such as an organization collecting data from the form depicted in the image.

As discussed herein, the machine learning based image analysis processes include a sequence of processes. In one exemplary embodiment, the sequence can include the sequence of machine learning based document rotation, detection and location of text segments, text recognition in segments, and key, value pair combining. In embodiments, the sequence of processes and machine learning technique applied in each process may be selected and tuned based on the goals, type of analysis performed, and type of input being analyzed during the process. For example, a different machine learning image analysis technique may be used for performing text rotation prediction than the machine learning image analysis technique used during text segmentation. Furthermore, the training data used to train the machine learning analysis techniques may be generated for the purpose of the operations being performed, the type of form, the language used in the form, likely implementations and/or formatting of such forms, etc. Embodiments of each of the sequential processes are discussed below.

Figure 4:
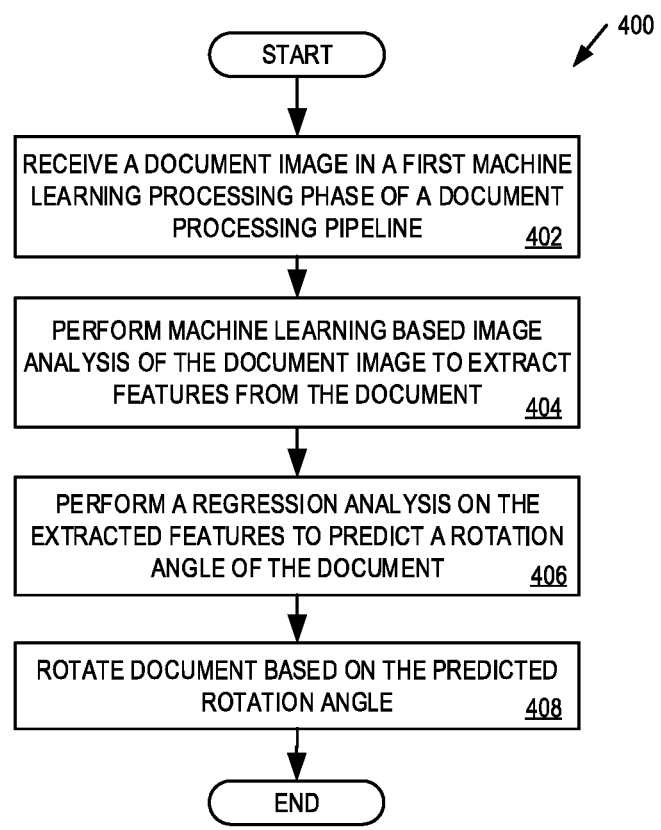
FIG. 4 is a flow diagram of one embodiment of a process for machine learning based document rotation of a received document image.

FIG. 4 is a flow diagram of one embodiment of a process 400 for machine learning based document rotation of a received document image. The process 400 is performed by processing logic that may comprise hardware (circuitry, dedicated logic, etc.), software (such as is run on a general purpose computer system or a dedicated machine), firmware, or a combination. In one embodiment, the process 400 is performed by a document processing pipeline (e.g., document processing pipeline 220) or a document recognition and extraction system (e.g., system 110 or 210).

Referring to FIG. 4, processing logic begins by receiving a document image in a first machine learning processing phase of a document processing pipeline (processing block 402). As discussed herein, the document image depicts an unstructured form, likely of low image quality, and the data on that form. Processing logic performs a machine learning based image analysis of the document image to extract features (e.g., lines, line directions and angles, box and table edges, angles of lines of text, etc.) from the document (processing block 404). In one embodiment, the machine learning based image analysis is a trained machine learning process that can process the input image, such as by using scanned pixel data as input, to extract the features from the document image. For example, the machine learning based image analysis may be performed using image data input into a support vector machine, neural network, regression, or other machine learning analysis system using a trained machine learning classifier. In one embodiment, a type of classifier may be selected which is optimal for detecting document rotation based on the types of input features, for example, a support vector machine or a neural network based machine learning system. Processing logic then performs a regression analysis on the extracted features to predict a rotation angle of the document (processing block 406), such as a number of degrees rotated away from a vertical orientation. The regression analysis is trained, for example, using documents with known rotation angles, and utilizes its learned relationships between features and rotation angle to make rotation angle predictions of previously unseen documents. The predicted rotation angle is then used by processing logic to rotate the document (processing block 408), such as to re-orient the document into alignment with a vertical axis.

Figure 5:
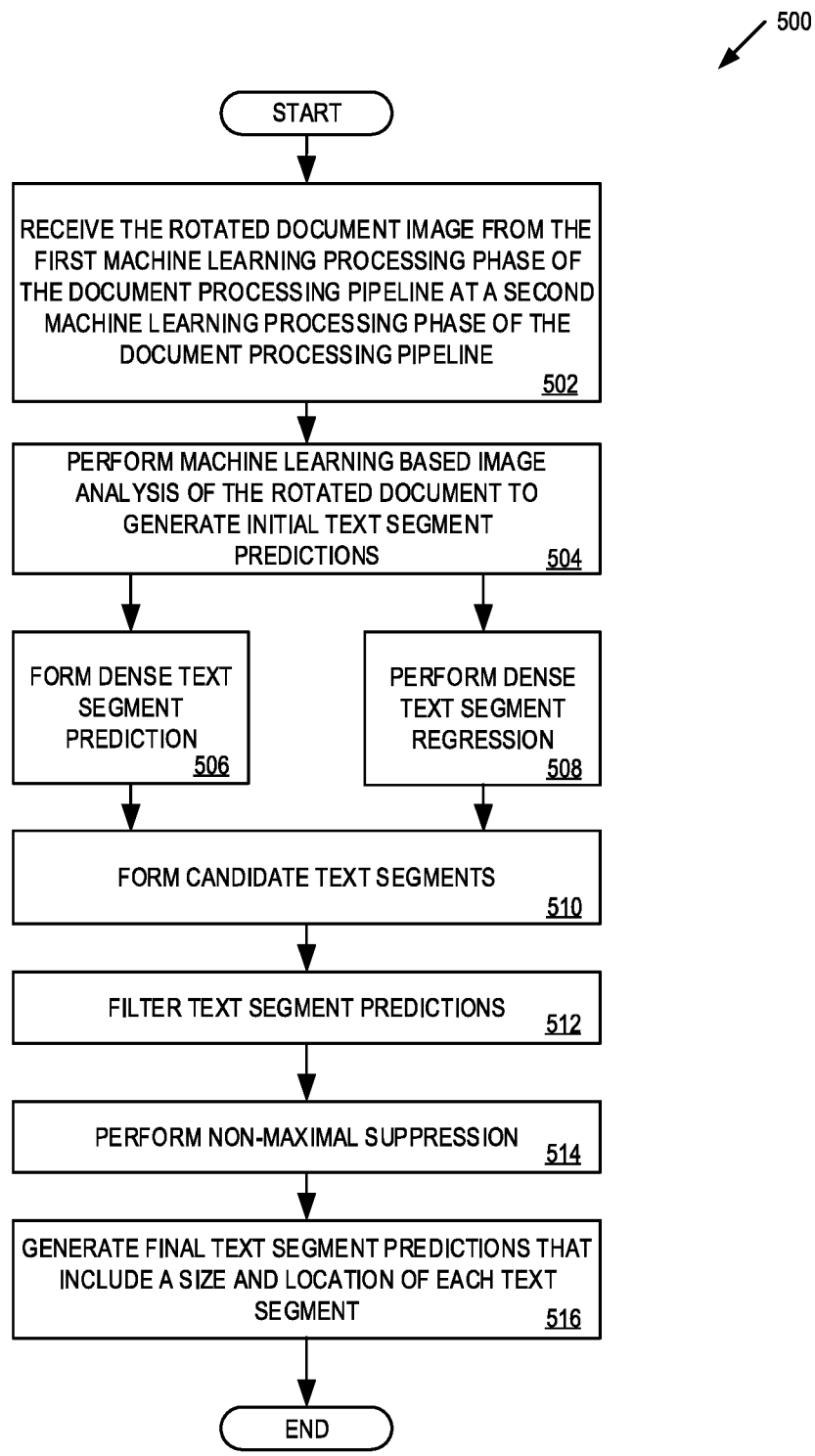
FIG. 5 is a flow diagram of one embodiment of a process for machine learning based text segmentation extraction from a document image.

FIG. 5 is a flow diagram of one embodiment of a process 500 for machine learning based text segmentation extraction from a document image. The process 500 is performed by processing logic that may comprise hardware (circuitry, dedicated logic, etc.), software (such as is run on a general purpose computer system or a dedicated machine), firmware, or a combination. In one embodiment, the process 500 is performed by a document processing pipeline (e.g., document processing pipeline 220) or a document recognition and extraction system (e.g., system 110 or 210).

Referring to FIG. 5, processing logic begins by receiving the rotated document image in a second machine learning processing phase of a document processing pipeline (processing block 502). The rotated document image, for example re-oriented to vertical to correct for skew in the original input image. Processing logic then performs a machine learning based image analysis of the rotated document to generate initial text segment predictions (processing block 504). In one embodiment, the features are extracted by a classifier (e.g., a support vector machine, regression based classifier, random forest, neural network, or other type of machine learning analysis technique) trained to extract features, such as edges, curves, areas with specific brightness, etc., that enable the machine learning based image analysis system to extract text segment predictions (e.g., locations of segments and bounds of the segments). Processing logic can then use the extracted features to form two pixel-wise predictions: the probability/prediction that a text segment exists at a pixel (processing block 506) and distances from that pixel to the edges of a predicted segment (processing block 508).

In embodiments, processing logic utilizes the predictions of processing blocks 504-508 to form candidate text segments (processing block 510). In one embodiment, a threshold may be applied to classify a predicted segment as either a 1 (e.g., contains a segment) or 0 (e.g., does not contain a segment). For example, probabilities from blocks 504-508 above 60%, 70%, 80%, 95%, etc. can be used as the threshold segment probability for assigning the segment a 1 or a 0. Then, in one embodiment, connected regions having values of 1 (e.g., contiguous pixel regions having above the threshold likelihood of belonging to a segment and within the same segment) can be identified. Finally, in one embodiment, for each connected region, a weighted average of the dense text segment predictions using dense segment probability as weight can be generated. In the above described embodiments, this can form a predicted text segment for each connected region.

Processing logic can then filter text segment predictions (processing block 512). In embodiments, text segment box shape and size may be used for filtering. For example, when box size surrounding a segment is above and/or below size thresholds, when box shape surrounding a segment lacks regularity, etc. For text segment predictions that survive the filtering, processing logic performs non-maximal suppression to remove highly overlapping boxes (processing block 514). In one embodiment, boxes surrounding predicted text segments are considered to be highly overlapping, and thus excluded by the non-maximal suppression when their overlap with a greedily chosen text segment exceeds a defined threshold.

Processing logic can then generate final text segment predictions that include size and location of each text segment (processing block 516). That is, processing logic outputs sizes and locations of text segments that can be used for generation of key, value pairs as text that represents the elements being extracted.

Figure 6:
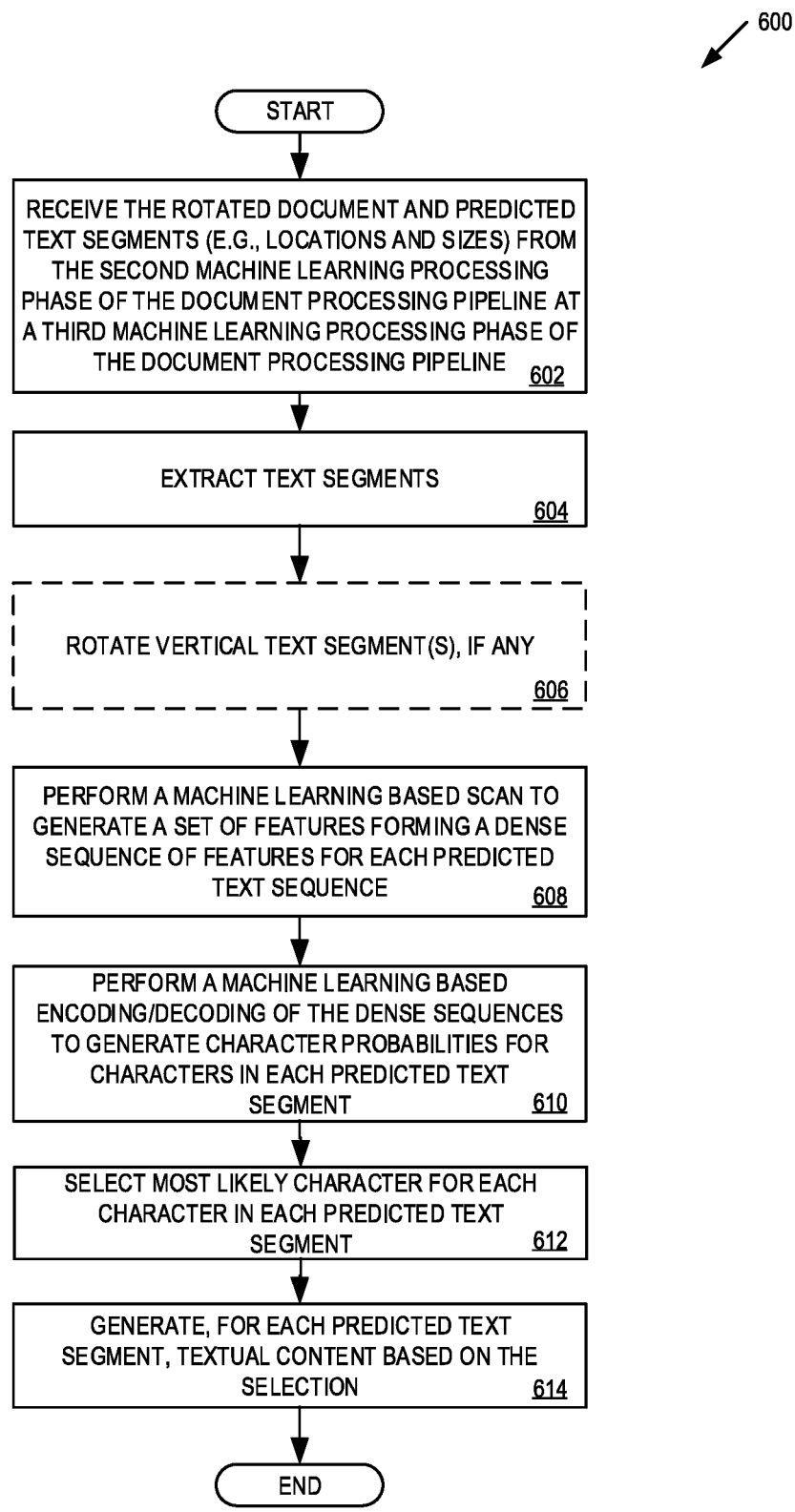
FIG. 6 is a flow diagram of one embodiment of a process for machine learning based text recognition of text segments extracted from the document image.

FIG. 6 is a flow diagram of one embodiment of a process 600 for machine learning based text recognition of text segments extracted from the document image. The process 600 is performed by processing logic that may comprise hardware (circuitry, dedicated logic, etc.), software (such as is run on a general purpose computer system or a dedicated machine), firmware, or a combination. In one embodiment, the process 600 is performed by a document processing pipeline (e.g., document processing pipeline 220) or a document recognition and extraction system (e.g., system 110 or 210).

Referring to FIG. 6, processing logic begins by receiving the rotated document image and predicted text segments (e.g., locations and sizes of segments) in a third machine learning processing phase of a document processing pipeline (processing block 602). In an embodiment, the predicted text segment locations are used to extract image patches from the rotated document based on location and size of each segment (processing block 604). Because some text in documents is written from top to bottom (as opposed to left to right (see, e.g., FIG. 8C), processing logic optionally rotates vertical text segments to horizontal (processing block 606). In embodiments, these segments are rotated because machine learning based feature extractors (e.g., a support vector machine, neural network, regression, or other type of machine learning analysis technique), such as that performed by processing logic (block 608), is configured to scan across image patch segments horizontally. In one embodiment, the vertical/horizontal orientation of a segment is determined using a classification technique based on text segment geometry for rotating vertical text by 90 degrees (e.g., to horizontal form) so the rotated segment may be fed into the machine learning based feature extractor at processing block 608.

In one embodiment, processing logic generates, using the machine learning based scan, for each horizontally oriented text segment a set of features that each form a dense sequence as the machine learning image analysis scans from left to right. This dense sequence of features has a length proportional to the width of the text segment, which is greater than the number of characters in the sequence. Thus, multiple values in the dense sequence represent single characters. Processing logic then performs a machine learning based encoding/decoding of the dense sequences to generate character probabilities for characters in each predicted text segment (processing block 610). In one embodiment, the set of sequences is fed into a trained machine learning analyzer, such as a neural network attention-based encoder-decoder architecture, which encodes the sequence of features into a single fixed-length representation before decoding it to a sequence of character probabilities. In embodiments, by using this method, the segment as a whole is recognized by the machine learning analysis before the character sequence is extracted.

Processing logic then selects the most likely character for each character in each predicted text segment (processing block 612). In embodiments, the sequence of character probabilities (e.g., from processing block 612) is used for generating a character sequence (processing block 614) where each character in the sequence has been selected by greedily choosing the most probable character at each step in the sequence. As discussed above, other types of character selection techniques, such as beam search and lexicon lookups, can also be used consistent with the discussion herein. Thus, the character sequences and textual content within those sequences is generated.

Figure 7:
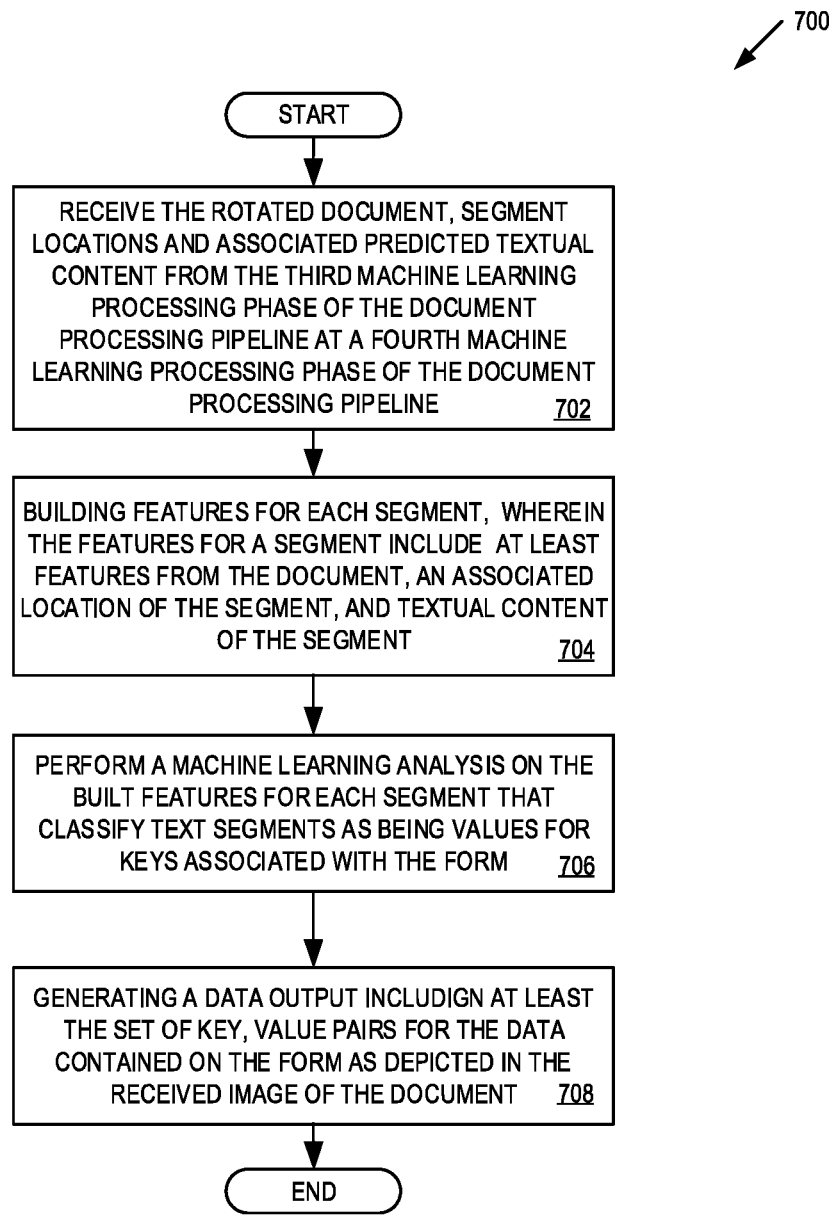
FIG. 7 is a flow diagram of one embodiment of a process for combining form keys with values extracted from recognized text values.

FIG. 7 is a flow diagram of one embodiment of a process 700 for combining form keys with values extracted from recognized text values. The process 700 is performed by processing logic that may comprise hardware (circuitry, dedicated logic, etc.), software (such as is run on a general purpose computer system or a dedicated machine), firmware, or a combination. In one embodiment, the process 700 is performed by a document processing pipeline (e.g., document processing pipeline 220) or a document recognition and extraction system (e.g., system 110 or 210).

Referring to FIG. 7, processing logic begins by receiving the rotated document image and segment locations and associated predicted textual content in a fourth machine learning processing phase of a document processing pipeline (processing block 702). Feature sets may then be built for each segment, including document features, segment location, textual content within segments, etc. (processing block 704). Textual content can be represented as a list of numbers of fixed size. The mapping from textual content to the numbers can learned using a machine learning technique or manually constructed. A machine learning analysis of the text segments and associated feature sets may then be performed to classify text segments as being values for keys associated with the form (processing block 706). As discussed herein, forms are associated with keys based on the type of form. For example, a form of a type insurance application may have keys representing data relevant to the form (e.g., name, age, occupation, etc.). In one embodiment, the machine learning analysis, which may be performed using a support vector machine, neural network, regression, random forest, or other type of machine learning analysis system, determines what text segments represent values relevant to the form depicted in the original document image, and what key each value is associated with. Processing logic may then generate a data output include at least the set of key, value pairs for the data contained on the form as depicted in the received image of the document (processing block 708). Additional data, such as the original and/or rotated document image, form and segment metadata, as well as other data, may be combined into a single electronic file suitable for transmission to an organization associated with the form depicted in the original document image.

Figure 9:
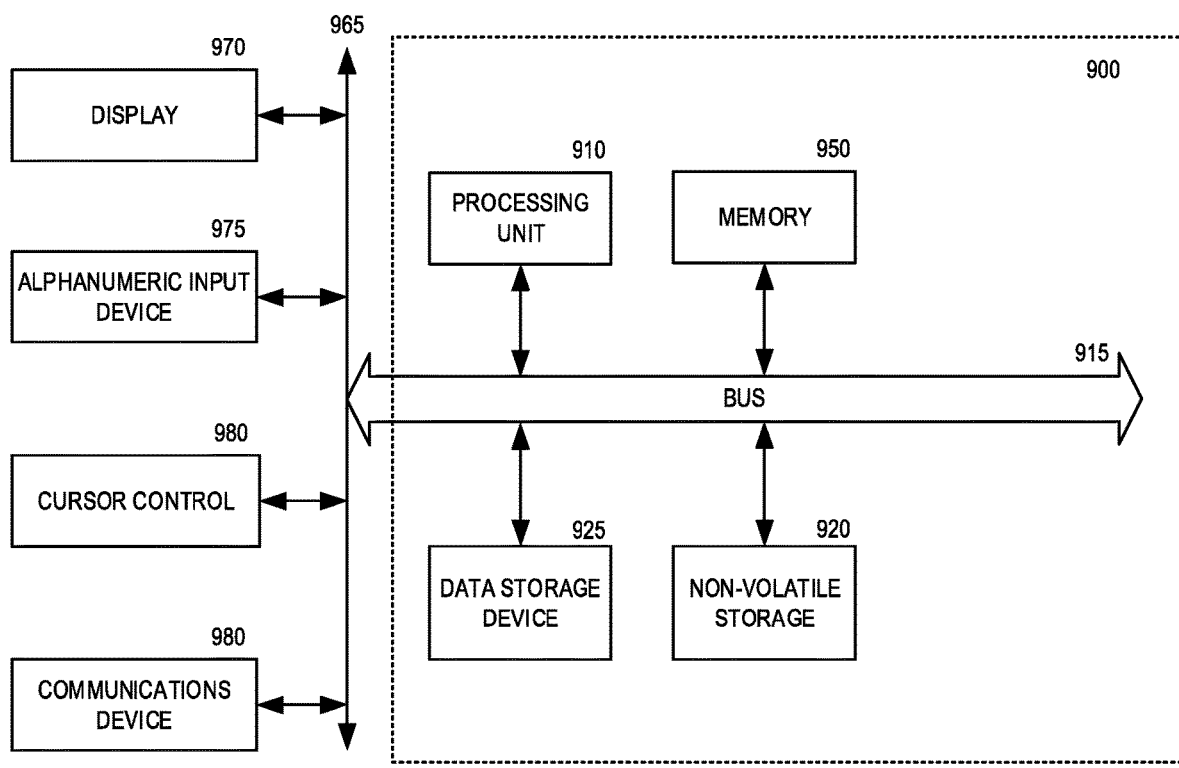
FIG. 9 is one embodiment of a computer system that may be used to support the systems and operations discussed herein

FIG. 9 is one embodiment of a computer system that may be used to support the systems and operations discussed herein. It will be apparent to those of ordinary skill in the art, however that other alternative systems of various system architectures may also be used.

The data processing system illustrated in FIG. 9 includes a bus or other internal communication means 915 for communicating information, and one or more processors (e.g., processor 910) coupled to the bus 615 for processing information. The system further comprises a random access memory (RAM) or other volatile storage device 950 (referred to as memory), coupled to bus 915 for storing information and instructions to be executed by processor 910. Main memory 950 also may be used for storing temporary variables or other intermediate information during execution of instructions by processor 910. The system also comprises a read only memory (ROM) and/or static storage device 920 coupled to bus 915 for storing static information and instructions for processor 910, and a data storage device 925 such as a magnetic, optical, solid storage, or other data storage device. Data storage device 925 is coupled to bus 915 for storing information and instructions.

The system may further be coupled to a display device 970, such as for example a light emitting diode (LED) display or a liquid crystal display (LCD) coupled to bus 915 through bus 965 for displaying information to a computer user. An alphanumeric input device 975, including alphanumeric and other keys, touch screens, etc., may also be coupled to bus 915 through bus 965 for communicating information and command selections to processor 910. An additional user input device is cursor control device 980, such as a touchpad, mouse, a trackball, stylus, or cursor direction keys coupled to bus 915 through bus 965 for communicating direction information and command selections to processor 910, and for controlling cursor movement on display device 970.

Another device, which may optionally be coupled to computer system 900, is a communication device 990 for accessing other nodes of a distributed system via a network. The communication device 990 may include any of a number of commercially available networking peripheral devices such as those used for coupling to an Ethernet, token ring, Internet, or wide area network. The communication device 990 may further be a null-modem connection, or any other mechanism that provides connectivity between the computer system 900 and the outside world. Note that any or all of the components of this system illustrated in FIG. 9 and associated hardware may be used in various embodiments as discussed herein.

It will be appreciated by those of ordinary skill in the art that any configuration of the system may be used for various purposes according to the particular implementation. The control logic or software implementing the described embodiments can be stored in main memory 950, mass storage device 925, or other storage medium locally or remotely accessible to processor 910.

It will be apparent to those of ordinary skill in the art that the system, method, and process described herein can be implemented as software stored in main memory 950 or read only memory 920 and executed by processor 910. This control logic or software may also be resident on an article of manufacture comprising a computer readable medium having computer readable program code embodied therein and being readable by the mass storage device 925 and for causing the processor 910 to operate in accordance with the methods and teachings herein.

The embodiments discussed herein may also be embodied in a handheld or portable device containing a subset of the computer hardware components described above. For example, the handheld device may be configured to contain only the bus 915, the processor 910, and memory 950 and/or 925. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include a processor 910, a data storage device 925, a bus 915, and memory 950, and only rudimentary communications mechanisms, such as a small touch-screen that permits the user to communicate in a basic manner with the device. In general, the more special-purpose the device is, the fewer of the elements need be present for the device to function.

It is to be understood that the above description is intended to be illustrative, and not restrictive. Many other embodiments will be apparent to those of skill in the art upon reading and understanding the above description. The scope should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the described embodiments to the precise forms disclosed. Many modifications and variations are possible in view of the above teachings. The embodiments were chosen and described in order to best explain the principles and practical applications of the various embodiments, to thereby enable others skilled in the art to best utilize the various embodiments with various modifications as may be suited to the particular use contemplated.

We claim:

1. A method for recognizing and extracting data from a form depicted within an image of a document, the method comprising:
   receiving, by a computer processing system, the image of the document, the image depicting the form and data contained on the form;
   transforming, by the computer processing system, the image of the document to a set of one or more key, value pairs by processing the image of the document with a sequence of two or more trained machine learning based image analysis processes, wherein keys are relevant to forms of the type depicted in the form, and wherein each value is associated with a key, wherein the two or more trained machine learning based image analysis processes comprise a plurality of different machine learning based image analysis processes performed within a document processing pipeline; and
   generating, by the computer processing system, a data output that comprises the set of key, value pairs for textual data recognized and extracted from the form depicted in the image.

2. The method of claim 1, wherein a description of a layout and a structure of the form depicted in the image of the document is unknown to the computer processing system.

3. The method of claim 1, wherein the method further comprises:
   performing a first machine learning based image analysis process to predict a rotation of the form depicted in the image of the document based on features extracted by a first machine learning based image analysis of the received image of the document; and
   generating a rotated document image that rotates the form depicted in the image of the document based on the predicted rotation.

4. The method of claim 3, wherein the form is rotated to a vertical orientation as depicted in the rotated document image.

5. The method of claim 3, wherein the method further comprises:
   performing a second machine learning based image analysis process to detect and locate text segments on the form depicted in the rotated document image based on features extracted by a second machine learning based image analysis of the rotated document image.

6. The method of claim 5, wherein the method further comprises:
   performing a third machine learning based image analysis process to extract features in the detected and located text segments based using a third machine learning based image analysis of the detected and located text segments;
   performing a fourth machine learning based image analysis process to generate text character probabilities for each text character within the detected and located text segments based using a fourth machine learning based image analysis of the features extracted from the detected and located text segments by the third machine learning based image analysis;
   selecting a most likely text character for each text character within the detected and located text segments based on the generated text character probabilities; and
   generating textual content for each detected and located text segment based on the selection of text characters for said detected and located text segment.

7. The method of claim 6, further comprising:
   performing a fifth machine learning based image analysis process to classify textual content for detected and located text segments using a fifth machine learning based image analysis of at least a location associated with a segment and text content contained within said segment.

8. The method of claim 1, wherein each of the plurality of different machine learning based image analysis processes comprises a machine learning analysis system executed by the computer processing system, and wherein each machine learning analysis system corresponding to each of the plurality of different machine learning based image analysis processes is trained using different training data relevant to a phase in the document processing pipeline in which machine learning image analysis is being performed.

9. The method of claim 1, wherein the form depicted within the image of the document comprises one of a medical form, an insurance form, or a loan application form.

10. A non-transitory computer readable storage medium including instructions that, when executed by a computer processing system, cause the computer processing system to perform operations for recognizing and extracting data from a form depicted within an image of a document, the operations comprising:

receiving the image of the document, the image depicting the form and data contained one the form, and wherein the form depicted in the image is unstructured;

transforming the image of the document to a set of one or more key, value pairs by processing the image of the document with a sequence of two or more trained machine learning based image analysis processes, wherein keys are relevant to forms of the type depicted in the image, and wherein each value is associated with a key, wherein the two or more trained machine learning based image analysis processes comprise a plurality of different machine learning based image analysis processes performed within a document processing pipeline; and generating a data output that comprises the set of key, value pairs for textual data recognized and extracted from the form depicted in the image.

11. The non-transitory computer readable storage medium of claim 10, wherein a description of a layout and a structure of the form depicted in the image of the document is unknown to the computer processing system.

12. The non-transitory computer readable storage medium of claim 10, wherein the operations further comprise:

performing a first machine learning based image analysis process to predict a rotation of the form depicted in the image of the document based on features extracted by a first machine learning based image analysis of the received image of the document; and generating a rotated document image that rotates the form depicted in the image of the document based on the predicted rotation.

13. The non-transitory computer readable storage medium of claim 12, wherein the form is rotated to a vertical orientation as depicted in the rotated document image.

14. The non-transitory computer readable storage medium of claim 12, wherein the operations further comprise:

performing a second machine learning based image analysis process to detect and locate text segments on the form depicted in the rotated document image based on features extracted by a second machine learning based image analysis of the rotated document image.

15. The non-transitory computer readable storage medium of claim 14, wherein the method further comprises:

performing a third machine learning based image analysis process to extract features in the detected and located text segments based using a third machine learning based image analysis of the detected and located text segments;

performing a fourth machine learning based image analysis process to generate text character probabilities for each text character within the detected and located text segments based using a fourth machine learning based image analysis of the features extracted from the detected and located text segments by the third machine learning based image analysis;

selecting a most likely text character for each text character within the detected and located text segments based on the generated text character probabilities; and generating textual content for each detected and located text segment based on the selection of text characters for said each detected and located text segment.

16. The non-transitory computer readable storage medium of claim 15, wherein the operations further comprise:

performing a fifth machine learning based image analysis process to classify textual content for detected and located text segments using a fifth machine learning based image analysis of at least a location associated with a segment and text content contained within said segment.

17. The non-transitory computer readable storage medium of claim 10, wherein each of the plurality of different machine learning based image analysis processes comprises of techniques for machine learning analysis system executed by the computer processing system, and wherein each machine learning analysis system corresponding to each of the plurality of different machine learning based image analysis processes is trained using different training data relevant to a phase in the document processing pipeline.

18. The non-transitory computer readable storage medium of claim 10, wherein the form depicted within the image of the document comprises one of a medical form, an insurance form, or a loan application form.

19. A system, comprising:

a network interface that receives an image of a document, the image depicting a form and data contained on the form, and wherein the form depicted in the image is unstructured;

a memory that stores the image of the document; and a processor coupled with the memory configured to access the image of the document and further configured to:

transform the image of the document to a set of one or more key, value pairs by processing the image of the document with a sequence of two or more trained machine learning based image analysis processes, wherein keys are relevant to forms of the type depicted in the image, and wherein each value is associated with a key, wherein the two or more trained machine learning based image analysis processes comprise a plurality of different machine learning based image analysis processes performed within a document processing pipeline, and generate a data output that comprises the set of key, value pairs for textual data recognized and extracted from the form depicted in the image.

20. The system of claim 19, wherein a description of a layout and a structure of the form depicted in the image of the document is unknown to the computer processing system.

* * * * *